United States Patent
Jackson

(10) Patent No.: US 9,845,582 B1
(45) Date of Patent: Dec. 19, 2017

(54) CONVERTIBLE PLOW SYSTEM FOR A VEHICLE

(71) Applicant: Cory Jackson, Parker, CO (US)

(72) Inventor: Cory Jackson, Parker, CO (US)

(*) Notice: Subject to any disclaimer, the term of this patent is extended or adjusted under 35 U.S.C. 154(b) by 0 days.

(21) Appl. No.: 15/377,810

(22) Filed: Dec. 13, 2016

(51) Int. Cl.
*E01H 5/06* (2006.01)
*E01H 5/04* (2006.01)
*B60R 19/52* (2006.01)
*B60Q 1/18* (2006.01)

(52) U.S. Cl.
CPC ............. *E01H 5/065* (2013.01); *B60R 19/52* (2013.01); *E01H 5/04* (2013.01); *E01H 5/061* (2013.01); *B60Q 1/18* (2013.01); *B60Q 2400/00* (2013.01)

(58) Field of Classification Search
CPC ............ E01H 3/06; E01H 3/063; E01H 3/065
USPC ................................... 37/196, 214, 231, 266
See application file for complete search history.

(56) References Cited

U.S. PATENT DOCUMENTS

| 4,524,532 A * | 6/1985 | Browning ............... E02F 3/401 172/197 |
| 9,267,305 B1 * | 2/2016 | Reynolds ................. E04H 5/06 |

* cited by examiner

*Primary Examiner* — Gary S Hartmann
(74) *Attorney, Agent, or Firm* — Leyendecker & Lemire, LLC

(57) ABSTRACT

A convertible snow plow system attachable to frame of a light duty truck, SUV or other suitable vehicle. The blade portion of the plow system is movable between deployed and retracted positions. In the retracted position the blade is positioned in front of the radiator and headlights of the vehicle functioning as a brush guard. To permit air to pass through the plow blade to the radiator, the blade comprises a plurality of movable louvers that can be opened when the plow is in the retracted position.

20 Claims, 8 Drawing Sheets

CONVERTIBLE PLOW SYSTEM FOR A VEHICLE

BACKGROUND

Snow plow attachments for vehicles and particularly light duty trucks are well know; however, the plows must typically be removed when not in use as they otherwise impede the practical use of the vehicle. Removable snow plow attachments also require a non-trivial amount of time and effort to attach and detach the plow making their use less convenient for spur of the moment use, such as might be desired in light to moderate snow fall situations. Plow attachments must be stored potentially taking up a significant amount of floor space when not in use. Additionally, plow attachments have little usefulness when an occasion arises warranting use but the attachment is not in the same location as the truck to which it is to be attached.

Retractable plow attachments have been proposed, but suffer from one or more significant drawbacks. For instance, U.S. Pat. No. 8,528,237 describes a plow that can be retracted underneath the associated vehicle; however, when in the retracted position, the effective ground clearance of the vehicle is severely reduced.

DETAILED DESCRIPTION

Figure 1:
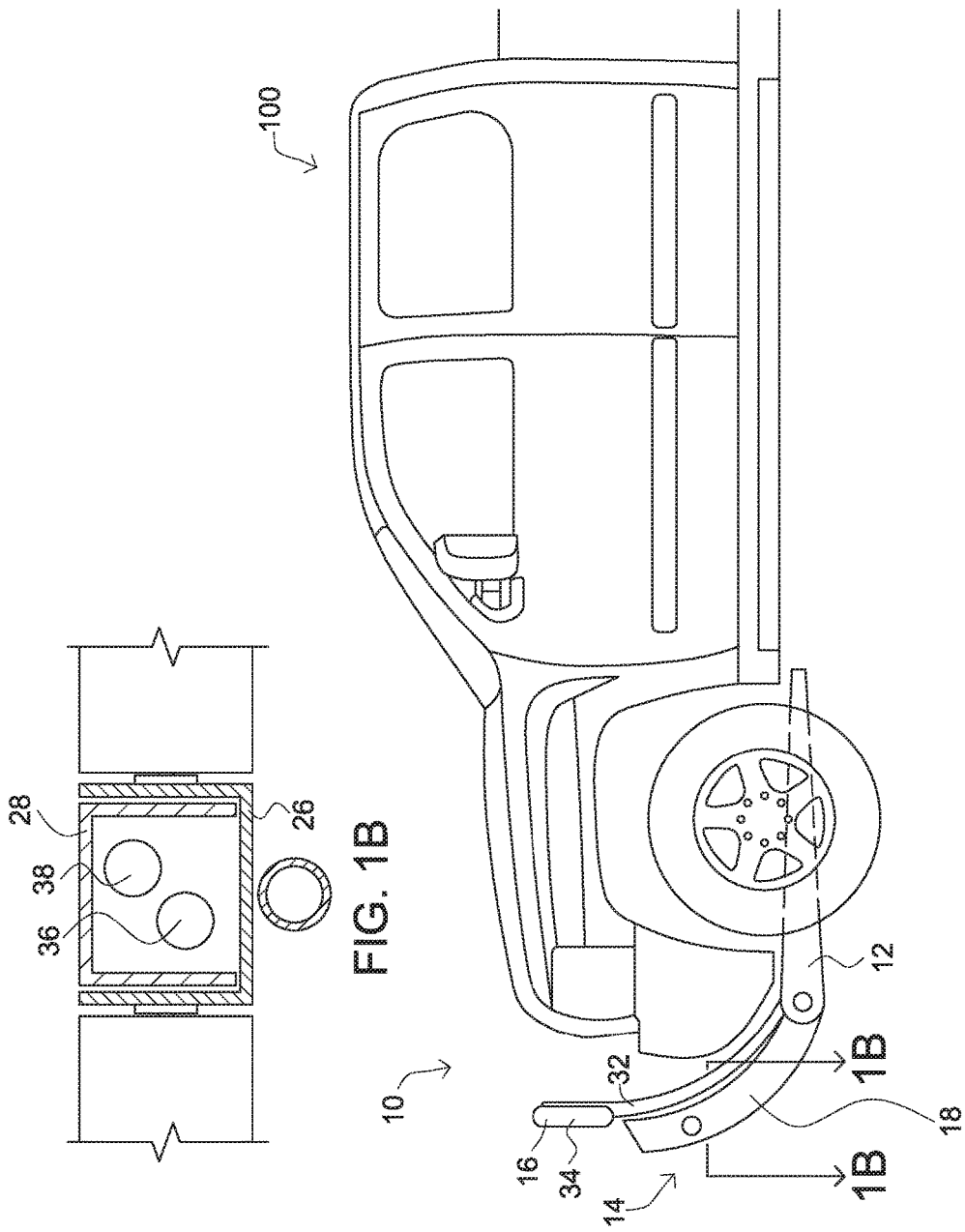
FIG. 1A is a side view of the convertible plow system in the brush guard or retracted position attached to a pickup truck according to an embodiment of the present invention.
FIG. 1B is a cross sectional view of the convertible plow system taken across line 1B-1B of FIG. 1A according to an embodiment of the present invention.

Embodiments of the invention comprise a snow plow system attachable to frame of a light duty truck, SUV or other suitable vehicle. Most plow systems for light duty vehicles require the plow blade to be installed on the truck when the plow is needed and uninstalled when it is not. In embodiments of the present invention, the blade portion of the plow system is movable between deployed and retracted positions. In the retracted position the blade is positioned in front of the radiator and headlights of the vehicle functioning as a brush guard. To permit light from the headlights and air to pass through the plow bade, the blade comprises a plurality of movable louvers that can be opened when the plow is in the retracted position.

In some embodiments, the convertible plow is manually movable between the deployed and retracted positions with latches or other mechanically locking mechanisms provided to secure the blade in a desired position as applicable. In other variations, the plow is coupled to hydraulic or motorized actuators to move the plow blade into the desired position. Additional actuators can be employed to open and close the blade louvers and/or tilt the plow blade left and right when in the deployed position.

Terminology

The terms and phrases as indicated in quotes (" ") in this section are intended to have the meaning ascribed to them in this Terminology section applied to them throughout this document, including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Convertible Plow System

FIGS. 1-9 show an embodiment of the plow system in various views and from various perspectives. The major components of the plow system include: a pair of frame mounting brackets 12, which can also include various actuators for tilting and deploying the plow blade; the plow blade assembly 14 that is pivotally coupled to the mounting brackets; and a brush guard/light bar assembly 16.

Figure 2:
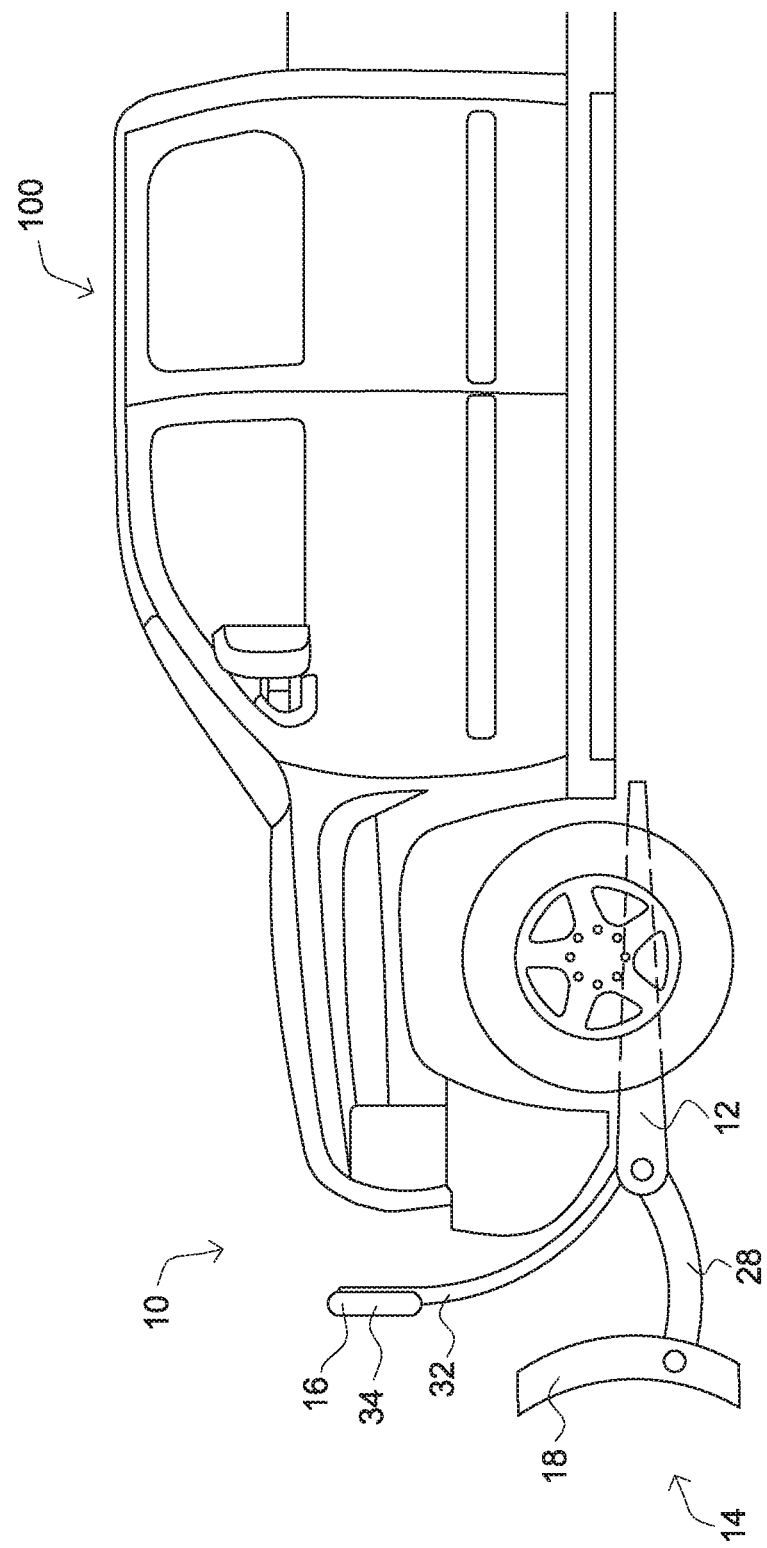
FIG. 2 is a side view of the convertible plow system in the brush guard or deployed position attached to a pickup truck according to an embodiment of the present invention.
Figure 3:
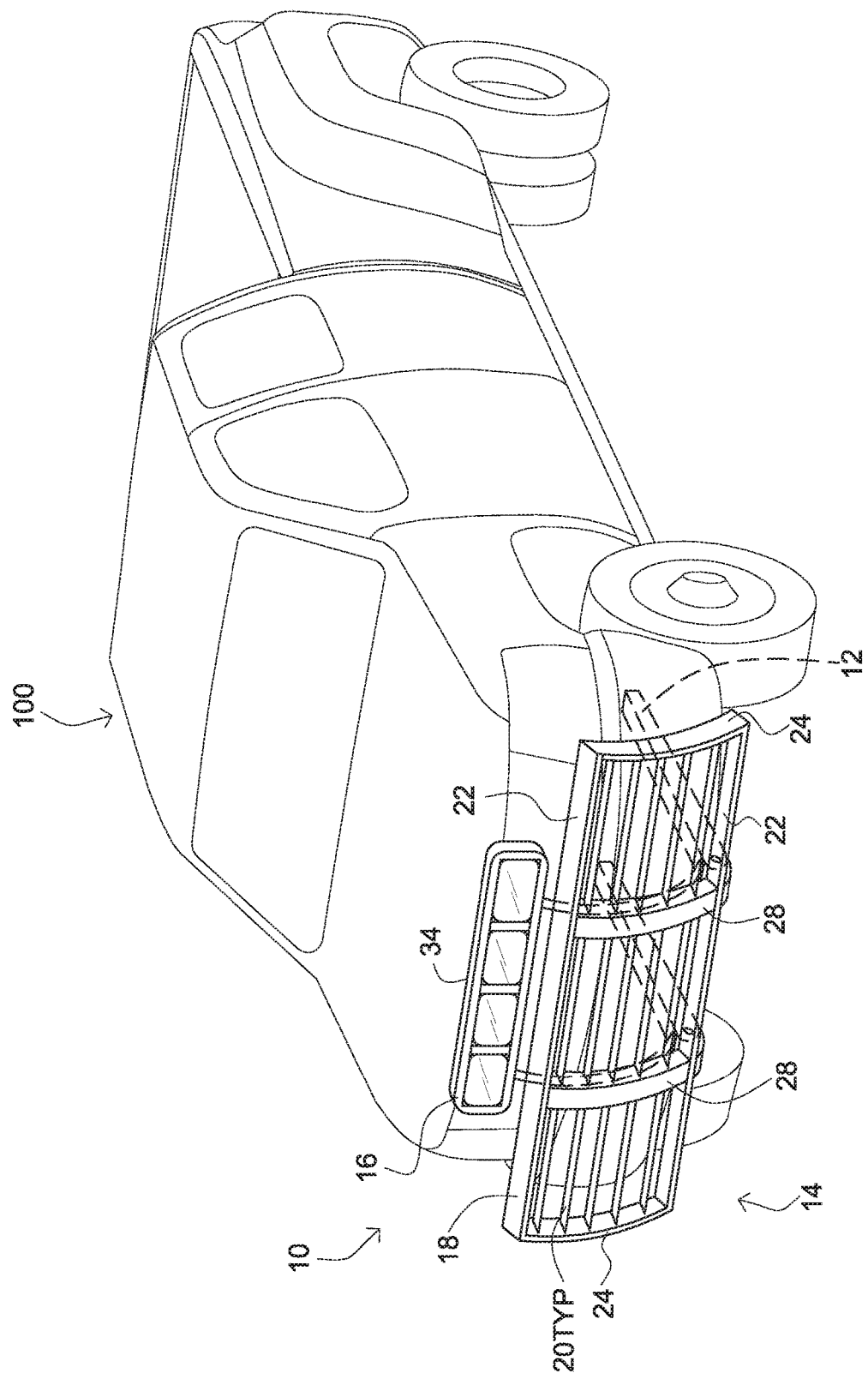
FIG. 3 is a perspective front view of the convertible plow system in the brush guard or retracted position as mounted on a truck according to an embodiment of the present invention.
Figure 4:
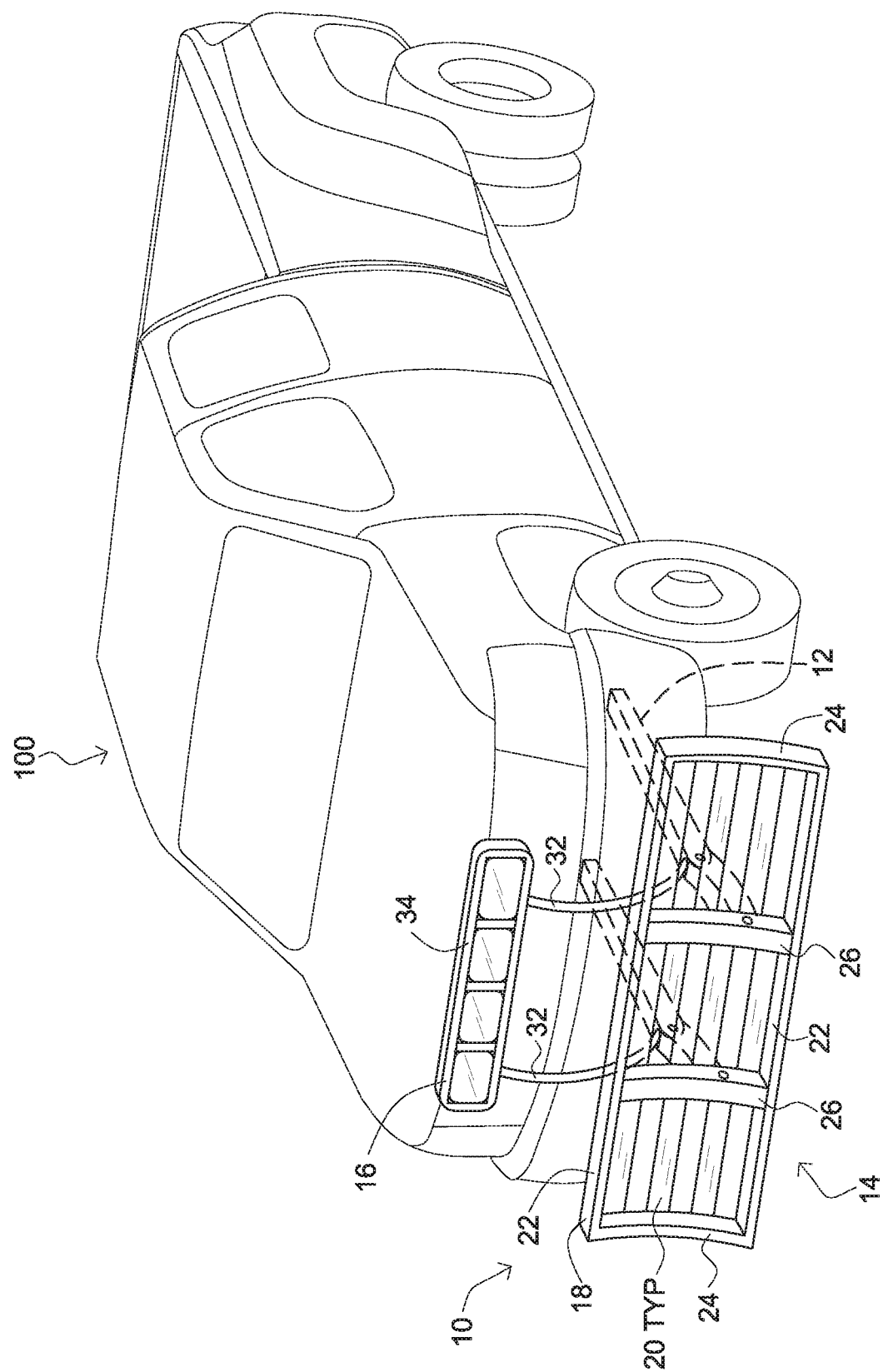
FIG. 4 is a perspective front view of the convertible plow system in the deployed position as mounted on a truck according to an embodiment of the present invention.

The plow system 10 is shown installed on a pickup truck in FIGS. 1A & 2-4. FIGS. 1A and 3 illustrate the plow system with the plow blade assembly in a retracted position with the blade frame 18 curving convexly away from the grill of the truck and the blade louvers 20 orientated in a generally horizontal position to permit air and, as necessary light from the headlight assembly to pass therethrough. FIGS. 2 and 4 illustrate the plow system in a deployed position with the plow blade frame outwardly convex and the louvers rotated to a more vertical position such that their respective edges overlap each other.

The plow blade frame is typically comprised of two elongated horizontally orientated members 22 that comprise the top and bottom edges of the plow blade assembly. The horizontal members are typically constructed of steel or aluminum and can be box sections or C-sections to provide enhanced stiffness. Curved side members 24, typically comprising the same materials as the horizontal members, couple the top and bottom horizontal members at their respective ends. The side members can comprise plate or may also be box sections or C-sections. Additionally, the frame includes a pair of intermediate support members 26 that extend between the top and bottom horizontal members. The intermediate members most typically comprise an aluminum or steel C-section with the open side of the section facing forwardly as shown in FIG. 1B.

Nested inside of the C-section of the left and right intermediate members when the plow blade assembly is in a retracted position are a pair of left and right extension arms 28. The extension arms are lowered when the plow is deployed and the plow blade frame 18 is rotated about the distal end of the extension arms to deploy it. In some variations the extension arms can be of the telescoping variety to permit the plow blade to be tilt left or right as is described later with reference to FIG. 9.

Each extension arm 28 is pivotally coupled to the distal end of a respective left or right frame mounting bracket 12. The pivotal connection at the distal ends of the extension arms to the plow blade frame 18 can comprise a ball joint to permit the necessary articulation when the blade is tilted to either the left or right sides.

Figure 6:
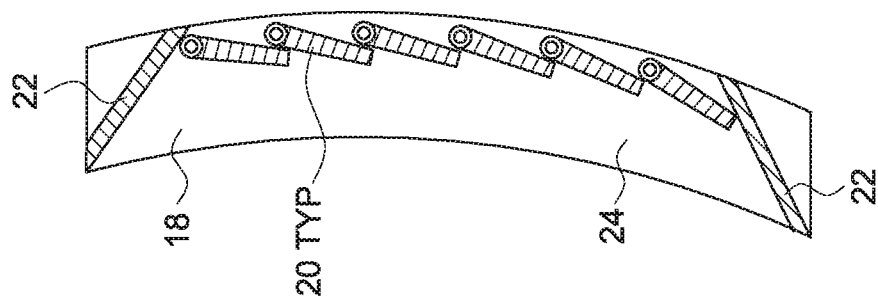
FIG. 6 is a cross section side view of the plow blade as in the deployed position with the louvers orientated in an closed position to permit plowing according to an embodiment of the present invention.
Figure 5:
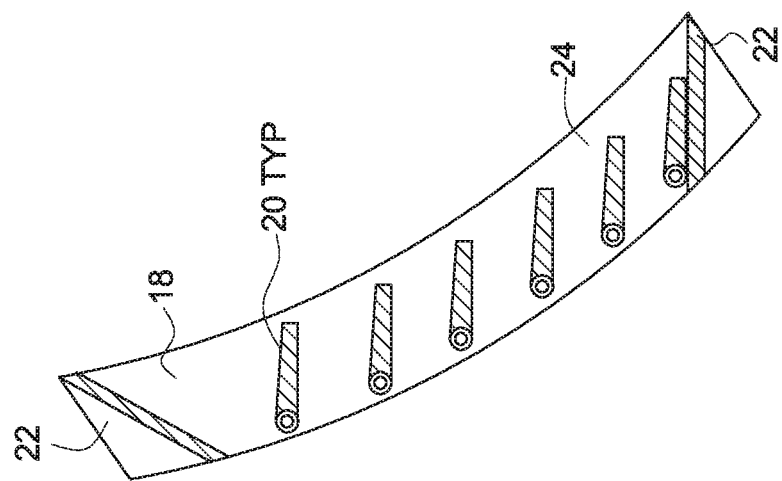
FIG. 5 is a cross section side view of the plow blade as in the brush guard position with the louvers orientated in an open position to permit air flow there through according to an embodiment of the present invention.

FIGS. 5 and 6 show a cross section of the blade assembly 14 showing the orientation of the louvers 20 relative to the plow blade frame depending on whether the plow is deployed or retracted. The louvers are typically comprised of steel and or aluminum. Each of a plurality of louvers are pivotally mounted at leading edges thereof to respective side or intermediate members at their ends. When in the retracted position, the louvers are horizontally orientated so that air can flow into the radiator through the gaps between adjacent louvers. As can be appreciated, the pivotal connections can have an appropriate amount of friction built in them to insure the louvers remain in the open position when orientated as such. In the deployed position, the louvers are rotated wherein the lower or trailing edge of a louver is resting on a leading or upper edge of the louver below it creating a closed face ideal for plowing snow or other debris. In some variations the louvers are manually positioned by the user. In other variations mechanical or electrical means can be provided for opening and closing the louvers. In yet other variations, the louvers can be appropriately weighted relative to their pivot points, so that they automatically pivot through gravity between the open position and the closed position when the plow blade assembly is moved between the retracted position and the deployed position.

Figure 7:
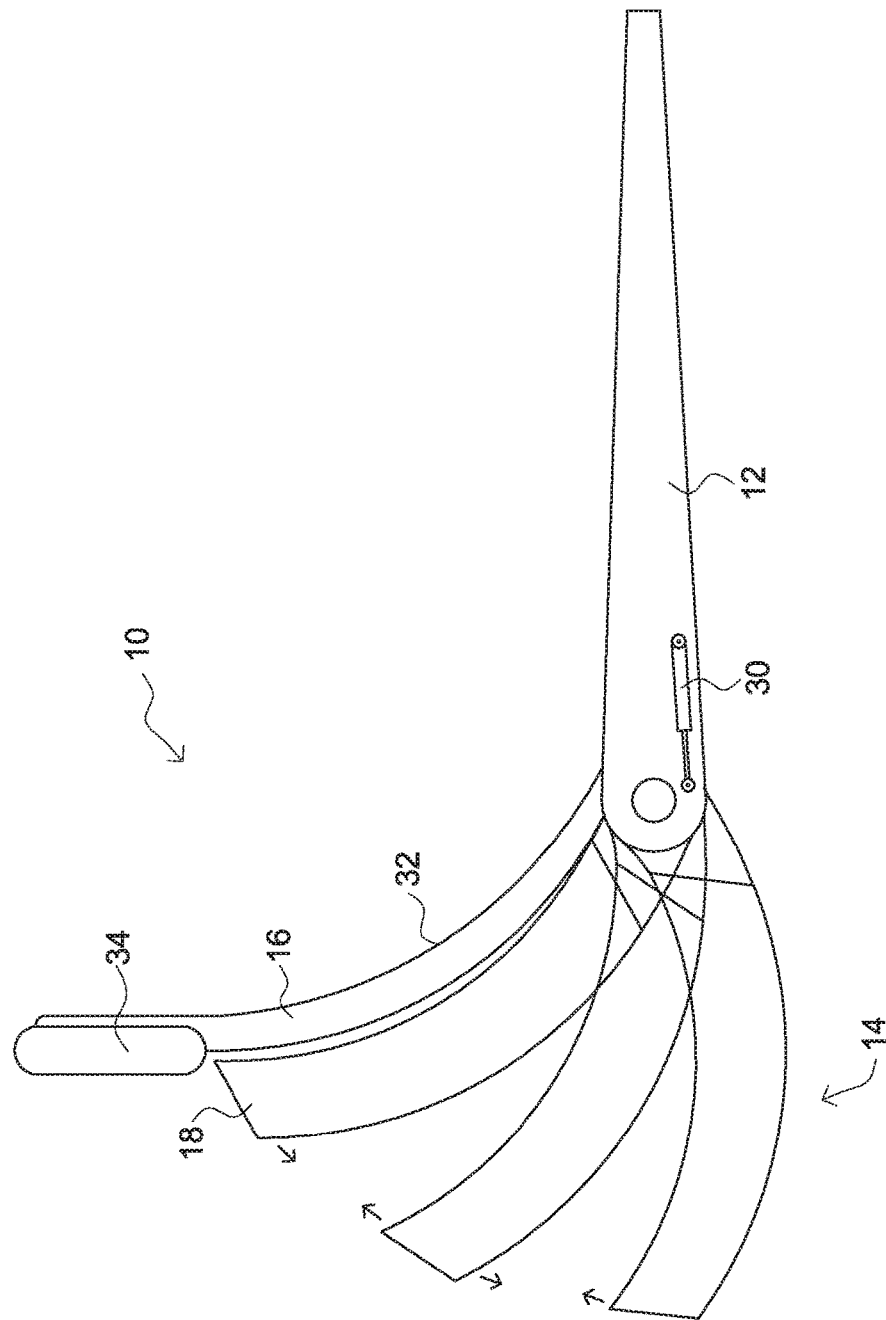
FIGS. 7 & 8 are side view outlines of the plow system illustrating the steps required to move the plow blade from the brush guard position to the deployed position according to an embodiment of the present invention.
Figure 8:
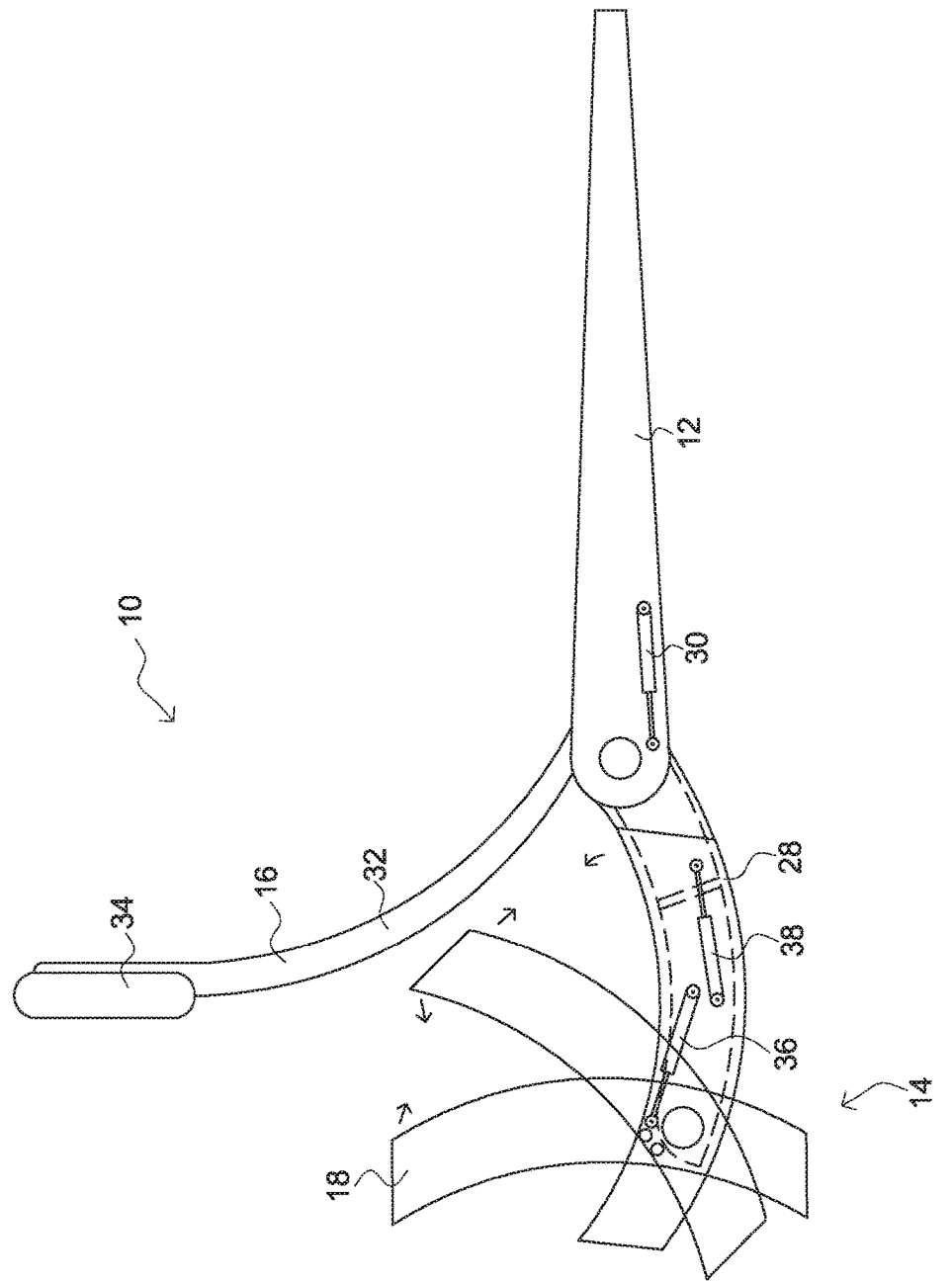
Figure 9:
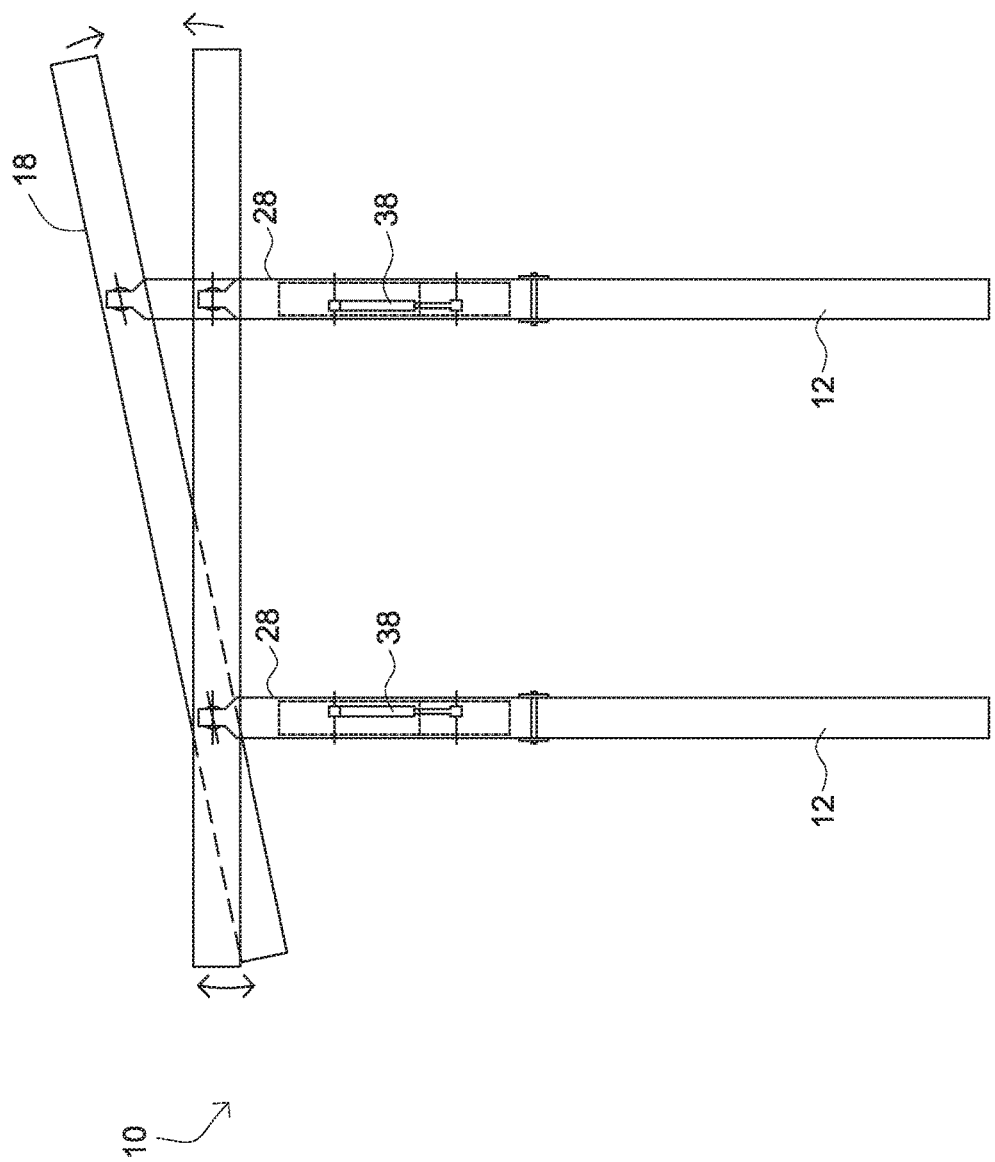
FIG. 9 is a top view diagram of the convertible plow system illustrating the mechanism for tilting the plow side to side according to an embodiment of the present invention.

The frame mounting brackets 12 can vary substantially depending on the type of truck that the snow plow system is being attached. In a typical body on frame type pickup truck, two brackets are provided each configured to mount against the parallel longitudinally extending frame members defining the truck's ladder frame. The mounts typically comprise either box or C-section defining a space in which an actuator can be secured and mounted for purposes of moving the extension arms between the deployed and retracted positions. The actuator 30 can also be mounted to the outside surface of the mounts. The mounts are one or both of bolted and or welded in place on the frame. The mounts are typically made of steel and extend forwardly of the front end of the truck frame terminating connections to the extension arms as best seen in FIGS. 7-9. The connections can be pivotal connections.

The brush guard/light bar assembly 16 is best shown in FIGS. 4 & 8 and comprises a pair of spaced curved upwardly-extending arms 32 that are each fixedly attached to a frame mounting bracket at a proximal end. A light bar 34 extends between distal ends of the arms. The light bar is typically positioned above the top edge of the plow blade when the blade is in the retracted position. The lights in the light bar can be of any suitable type and quantity. It is appreciated that the brush guard/light bar assembly is optional and need not be incorporated in all variations of the plow system 10.

As mentioned depending on the variation of the plow system, it can be moved between the deployed and retracted positions manually, through the use of powered actuators 30, 36 & 38 or through a combination of both. FIGS. 7-9 illustrate the positioning of various actuators. The actuators can comprise pneumatic or hydraulic actuators or electric motor driven actuators. The size and capacity of the actuators can vary depending on the loads that they must exert. For actuators that are pneumatically or hydraulically actuated pumps and compressors would be employed to provide the compressed gas or hydraulic fluid to the actuators. As can be appreciated buttons are provided either within the cab of the truck, on the plow itself or in a remote to facilitate deployment or retraction of the plow. Although not illustrated, solenoid latches can also be employed as desired to lock the plow in either position. Some embodiments further incorporate a control system to control the retraction and deployment of the plow wherein the system stops deployment or retraction if the load increases above a predetermined level indicating an obstruction.

Manually actuated variations of the snow plow system can include latches that secure the plow in either position and are released prior to moving the plow into a new position. The latches can be the type that automatically lock when moved into the new position or they can be the type that must be manually locked once the plow has been moved into the desired position.

Installation of an Embodiment of a Convertible Plow System

Installation of the convertible plow system involves first choosing the proper size and type of mounting brackets 12 for a particular vehicle. Ladder on frame construction as is present in the truck illustrated in the Figures typically uses two frame mounting brackets; whereas, mounting brackets for unibody vehicles are differently configured to spread the load of the plow over a larger area. The brackets are either welded or bolted in place such that the distal ends of the brackets are properly positioned relative to the front of the associated vehicle.

After installation of the brackets, the brush guard assembly 16, is affixed to the mounting brackets typically with the use of threaded bolts. Next, the extension arms 28 are attached to the mounting brackets. As applicable, actuators 30 are connected between the mounting brackets and the extension arms.

The plow blade assembly 14 is coupled to the distal ends of the extension arms 28 and the associated actuators 36 & 38 are also bolted in place.

As necessary, electrical wires and/or hydraulic cables are attached to the various actuators and the hydraulic and/or electrical systems are coupled to the truck 100.

As can be appreciated the plow system can be left on the truck year round; however, the plow assembly and/or the light bar can be selectively removed as desired leaving the mounting brackets installed.

Operation and Use of an Embodiment of a Convertible Plow System

During normal operation of the vehicle to which the plow system is attached, the plow blade is maintained in a retracted position as shown in FIG. 3 for instance. The louvers are maintained in an open position to permit air flow there through to the radiator unimpeded.

When a user desires to use the plow, he/she deploys the plow blade as illustrated in FIGS. 7 & 8 by activating the pneumatic, hydraulic or electric actuators typically, but not necessarily by way of a button(s) or switch(es) in the vehicle's cab. In variations, the user may manually release one or more position locks and manually extend and rotate the plow blade assembly.

Either before or after the plow blade assembly is extended, the louvers are rotated into the closed position as shown in FIG. 6. In some variations, solenoids or other mechanical mechanisms can be utilized to automatically rotate the louvers. In other variations, the louvers are rotated by the user.

Once in the deployed position, the user can begin plowing. As necessary, the extension arm linear actuators 30 can be used to adjust the height of the plow blade assembly relative to the ground. Additionally, as shown in FIG. 9, the tilt angle of the plow blade assembly relative to the vehicle can be changed by actuating linear actuators 38 using switches or buttons provided in the vehicle to vary the length of the extension arms 28.

VARIATIONS AND OTHER EMBODIMENTS

The various embodiments, methods and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A convertible plow system for use on a vehicle, the plow system comprising:
   one or more frame mounting brackets;
   at least a pair of extension arms, the extension arms being pivotally coupled to the one or more mounting brackets and being movable between at least a deployed extension arm position and a retracted extension arm position, the pair of extension arms extending substantially upwardly in the retracted extension arm position when mounted on the vehicle and the pair of extension arms extending substantially outwardly from the vehicle in the deployed extension arm position when mounted on the vehicle; and
   a plow blade assembly, the plow blade assembly comprising (i) a plow framework having a concave curvature, a top edge, a bottom edge, and left and right side edges, the plow framework being pivotally attached to a distal end of each extension arm of the pair of extension arms, (ii) a plurality of louvers, each louver of the plurality of lovers being pivotally mounted to the plow framework and collectively having at least an open orientation and a closed orientation;
   wherein the plow blade assembly is moveable between a deployed plow blade position and a retracted plow blade position when mounted on the vehicle with the bottom edge of the plow frame work being adjacent to a ground surface and the concave curvature facing away from the vehicle in the deployed plow blade position and with the plow frame work being in front of a grill of the vehicle and the concave curvature facing towards the vehicle in the retracted plow blade position.

2. The convertible plow system of claim 1, further comprising at least one extension arm actuator, the at least one extension arm actuator being coupled to a frame mounting bracket of the one or more frame mounting brackets at a first end and to an extension arm of the pair of extension arms at a second end, wherein the at least one extension arm actuator is adapted for at least partially moving the plow frame between the deployed and retracted positions.

3. The convertible plow system of claim 2, wherein the at least one extension arm actuator includes first and second extension arm actuators.

4. The convertible plow system of claim 2, wherein the at least one extension arm actuator comprises a linear actuator.

5. The convertible plow system of claim 1, further comprising at least one plow frame actuator, the at least one plow frame actuator being coupled to an extension arm of the pair of extension arms at first end and to the plow frame at a second end, wherein the at least one plow frame actuator is adapted for at least partially moving the plow system between the deployed and retracted positions.

6. The convertible plow system of claim 2, further comprising at least one plow frame actuator, the at least one plow frame actuator being coupled to an extension arm of the pair of extension arms at first end and to the plow frame at a second end, wherein the at least one plow frame actuator is adapted for at least partially moving the plow system between the deployed and retracted positions.

7. The convertible plow system of claim 1, wherein each of the pair of extension arms comprise a pair nested of telescoping tubes and the convertible plow system further includes a pair of tilt actuators, each tilt actuator coupled to the nested telescoping tubes of a respective extension arm wherein when the plow system is mounted on the truck, the tilt actuators are adapted to change the angle of the plow frame relative to the truck.

8. The convertible plow system of claim 6, wherein each of the pair of extension arms comprise a pair nested of telescoping tubes and the convertible plow system further includes a pair of tilt actuators, each tilt actuator coupled to the nested telescoping tubes of a respective extension arm wherein when the plow system is mounted on the truck, the tilt actuators are adapted to change the angle of the plow blade assembly relative to the truck.

9. The convertible plow system of claim 1, further including a light bar assembly.

10. The convertible plow system of claim 8, further including a light bar assembly.

11. A motor vehicle including the convertible plow system of claim 1.

12. A motor vehicle including the convertible plow system of claim 8.

13. The convertible plow system of claim 1, wherein each of the plurality of louvers is coupled to the plow frame proximate a leading edge thereof.

14. The convertible plow system of claim 1, further comprising louver actuators, the louver actuators adapted for moving the plurality of louvers between the open and closed orientations.

15. The convertible plow system of claim 1, wherein the plurality of louvers are adapted for manual movement between the open and closed orientations.

16. The convertible plow system of claim 15, wherein the plow system is adapted for manual movement between the deployed and retracted positions.

17. The convertible plow system of claim 1, wherein the one or more frame mounting brackets comprise a pair of frame mounting brackets.

18. The convertible plow system of claim 1, wherein the plurality of louvers overlap to form a plow blade face when in the closed orientation and wherein the plurality of louvers are substantially parallel and spaced apart in the open orientation to permit the free flow of air therethrough.

19. A method of configuring the convertible plow system of claim 1 for use as a plow on a motor vehicle, the method comprising:
   providing the motor vehicle having the convertible plow system attached thereto;
   moving the at least a pair of extension arms from a retracted extension arm position to a deployed extension arm position;
   moving the plow blade assembly from a retracted plow blade position to a deployed plow blade position; and
   moving the plurality of louvers from an open orientation to a closed orientation.

20. A method of configuring the convertible plow system of claim 1 for use as a plow on a motor vehicle, the method comprising:
   providing the motor vehicle having the convertible plow system attached thereto;
   moving the at least a pair of extension arms from a retracted extension arm position to a deployed extension arm position;
   moving the plow blade assembly from a retracted plow blade position to a deployed plow blade position;
   moving the plurality of louvers from an open orientation to a closed orientation; and
   actuating one or both of the pair of tilt actuators to tilt the plow blade assembly to one of the right and the left.

* * * * *